(12) United States Patent
Gallmeyer et al.

(10) Patent No.: US 11,306,669 B1
(45) Date of Patent: Apr. 19, 2022

(54) SYSTEM, APPARATUS, AND METHOD FOR CONTROLLING AN ENGINE SYSTEM TO ACCOUNT FOR VARYING FUEL QUALITY

(71) Applicant: Caterpillar Inc., Peoria, IL (US)

(72) Inventors: Christopher F. Gallmeyer, Chillicothe, IL (US); Geetika Dilawari, Dunlap, IL (US); Shawn M. Damm, Peoria, IL (US); Shivangi Wagle, Peoria, IL (US); Hannes Marscheider, Schuelldorf (DE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/121,783

(22) Filed: Dec. 15, 2020

(51) Int. Cl.
*F02D 41/00* (2006.01)

(52) U.S. Cl.
CPC ...... *F02D 41/0025* (2013.01); *F02D 2200/08* (2013.01); *F02D 2200/0802* (2013.01)

(58) Field of Classification Search
CPC ...... F02D 19/10; F02D 19/0642; F02D 41/00; F02D 41/0025; F02D 41/14; F02D 41/1462; F02D 41/403; F02D 2200/08; F02D 2200/0802; F02D 2200/024; F02D 2200/0618; F02D 2200/0611
USPC ................................................ 701/102–105
See application file for complete search history.

(56) References Cited

U.S. PATENT DOCUMENTS

| | | | |
|---|---|---|---|
| 6,000,384 A | 12/1999 | Brown et al. | |
| 7,021,287 B2 | 4/2006 | Zhu et al. | |
| 7,168,411 B2 | 1/2007 | Bourn et al. | |
| 9,169,794 B2 | 10/2015 | Gehrke et al. | |
| 9,388,728 B2* | 7/2016 | Chandrasekaran | F01N 11/00 |
| 9,593,629 B2 | 3/2017 | Rasmussen et al. | |
| 9,638,116 B2* | 5/2017 | Vos | F02D 41/1447 |
| 9,945,308 B2 | 4/2018 | Gough et al. | |
| 10,378,404 B2 | 8/2019 | De Smet et al. | |
| 2005/0114010 A1* | 5/2005 | Healy | F23N 1/002 701/100 |
| 2007/0047616 A1* | 3/2007 | Izumiura | F02D 41/222 374/144 |
| 2009/0288397 A1* | 11/2009 | Shimomura | F01N 9/00 60/286 |
| 2018/0258813 A1* | 9/2018 | Quigley | F01N 3/2066 |
| 2019/0195149 A1 | 6/2019 | Sixel et al. | |
| 2019/0391108 A1* | 12/2019 | Wu | G01N 27/49 |
| 2020/0386175 A1 | 12/2020 | Fiveland et al. | |

\* cited by examiner

*Primary Examiner* — John Kwon
*Assistant Examiner* — Johnny H Hoang
(74) *Attorney, Agent, or Firm* — Xsensus LLC

(57) ABSTRACT

A system, apparatus, and method for controlling an engine system can provide fuel reactivity compensation control for an engine of the engine system. The control can include controlling pilot fuel quantity supplied to an engine based on a pilot fuel offset value; and controlling air-to-fuel ratio (AFR) for the engine based on an AFR control trim value. A NOx error value can be used to generate one of the pilot fuel offset value or the AFR control trim value, and an exhaust temperature error value can be used to generate the other of the pilot fuel offset value or the AFR control trim value.

19 Claims, 5 Drawing Sheets

SYSTEM, APPARATUS, AND METHOD FOR CONTROLLING AN ENGINE SYSTEM TO ACCOUNT FOR VARYING FUEL QUALITY

TECHNICAL FIELD

Embodiments of the disclosed subject matter relate to engine control, and more particularly to systems, apparatuses, and methods for controlling an engine system to account for varying fuel quality.

BACKGROUND

In certain instances, fuel to be provided to an engine, such as a dual fuel engine that uses liquid and gaseous fuels, may be of unknown quality. In the case of diesel fuel as the liquid fuel, quality may be characterized according to a cetane index (CI), whereas quality of gaseous fuel may be characterized according to its methane number. In addition to potentially being unknown, the quality of the fuel may vary from source to source. For example, a marine vessel, such as a cruise ship, may bunker (i.e., dock) at different ports having fuels of varying quality.

Conventionally, multiple flash files with separate performance calibration adjustments may be used to calibrate the engine based on the quality of each fuel for the engine fuel system. In the case of the dual fuel engine, the performance calibration adjustments can be for different combinations of fuel quality for the different types of fuel. In any case, a relatively large number of flash files may be needed to cover an entire required range of cetane indices and/or methane numbers for diesel fuel and gaseous fuel, respectively.

Use of the flash files can first involve identification of the fuel quality prior to selecting the flash file or files. The customer may request fuel quality information from the fuel supplier or otherwise test the fuel upon arrival. However, the requested fuel quality information may not be readily available or even if available may be outdated. Additionally, the customer may not have the capacity to test fuel quality, for instance, due to time constraints, expertise, testing equipment availability, etc.

Creation of the flash files may require hand tuning (e.g., on a test bed) and its own official IMO measurement for qualities of each fuel and/or combination of fuels in the case of the dual fuel engine. However, in that the qualities of fuel can vary and may not be known specifically in advance, the flash files may not suitably cover the actual quality or qualities of fuel at a particular source for acceptable or optimal calibration of the engine, or otherwise the flash files may need to be generated anew. In any case, flashing calibrations each time a new fuel is encountered may be undesirable, for instance, due to time constraints, lack of fuel quality information, etc.

Failure to calibrate the engine according to the specific fuel quality or qualities can cause or lead to one or more of the following undesirable conditions: high turbine inlet temperatures, detonation (knock), misfire, and/or emissions out of compliance (e.g., nitrous oxide (NOx) out of compliance). Issues such as the foregoing can lead to additional engine system performance issues and may even cause hardware damage to the engine or associated components or systems.

U.S. Pat. No. 6,000,384 ("the '384 patent") describes a method for balancing the air/fuel ratio to each cylinder of an engine. The '384 patent describes that by using the exhaust port temperature measurements and/or detonation level measurements from each individual cylinder as a controlling parameter, the delivery of fuel to that particular cylinder can be trimmed to achieve the desired exhaust port temperature and/or predetermined detonation level. According to the '384 patent, balancing the exhaust port temperature and/or detonation level for each such cylinder to a common desired exhaust port temperature and/or detonation level likewise produces a substantially identical air/fuel ratio in each such cylinder.

SUMMARY

According to an aspect an engine control method is disclosed or implemented. The method, which can be performed based on a non-transitory computer-readable storage medium having stored thereon instructions that, when executed by one or more processors, cause the one or more processors to perform the method, can comprise: controlling pilot fuel quantity supplied to an engine based on a generated pilot fuel offset value; and controlling air-to-fuel ratio (AFR) for the engine based on a generated AFR control trim value. A NOx error value can be used to generate one of the pilot fuel offset value or the AFR control trim value, and an exhaust temperature error value can be used to generate the other of the pilot fuel offset value or the AFR control trim value.

In another aspect, a method of providing fuel reactivity compensation for a dual fuel engine is disclosed or implemented. The method can comprise: controlling, using control circuitry, pilot fuel quantity supplied to the dual fuel engine for operation of the dual fuel engine based on a generated pilot fuel offset signal; and controlling, using the control circuitry, air-to-fuel ratio (AFR) for the operation of the dual fuel engine based on a generated AFR control trim signal. A NOx error value can be used to generate one of the pilot fuel offset signal or the AFR control trim signal, and an exhaust temperature error value can be used to generate the other of the pilot fuel offset signal or the AFR control trim signal. The NOx error value can be generated from a comparison of an actual NOx value from a NOx sensor and a desired NOx value. The exhaust temperature error value can be generated from a comparison of an actual exhaust temperature value and a desired exhaust temperature value.

And in another aspect an engine control system for a dual fuel engine is disclosed or provided. The engine control system can comprise: a nitrous oxide (NOx) sensor configured to sense NOx generated from operation of the dual fuel engine; and an engine control module (ECM) configured to control, in real time, pilot fuel quantity and air-to-fuel ratio (AFR) for the operation of the dual fuel engine. The ECM can include a NOx controller and an exhaust temperature controller to perform fuel reactivity compensation. The NOx controller can be configured to generate, according to closed-loop control, a NOx error signal based on a comparison of an actual NOx signal from the NOx sensor and a desired NOx signal generated from a mapping operation of the NOx controller. The exhaust temperature controller can be configured to generate, according to closed-loop control, an exhaust temperature error signal based on a comparison of an actual exhaust temperature signal and a desired exhaust temperature signal generated from a mapping operation of the exhaust temperature controller. One of the NOx controller or the exhaust temperature controller can be configured to generate an additive pilot fuel offset signal and the other of the NOx controller or the exhaust temperature controller can be configured to generate a multiplicative AFR control trim signal. The ECM can be configured to output, at the same time, a pilot fuel quantity control signal generated from additive trimming according to the generated additive pilot fuel offset signal, and an AFR control signal generated from multiplicative trimming according to the generated multiplicative AFR control trim signal to decrease the NOx error signal and maintain the actual exhaust temperature signal within a predetermined, load-dependent exhaust temperature range.

Other features and aspects of this disclosure will be apparent from the following description and the accompanying drawings.

DETAILED DESCRIPTION

Embodiments of the disclosed subject matter relate to engine control, and more particularly to systems, apparatuses, and methods for controlling an engine system to provide fuel reactivity compensation.

Figure 1:
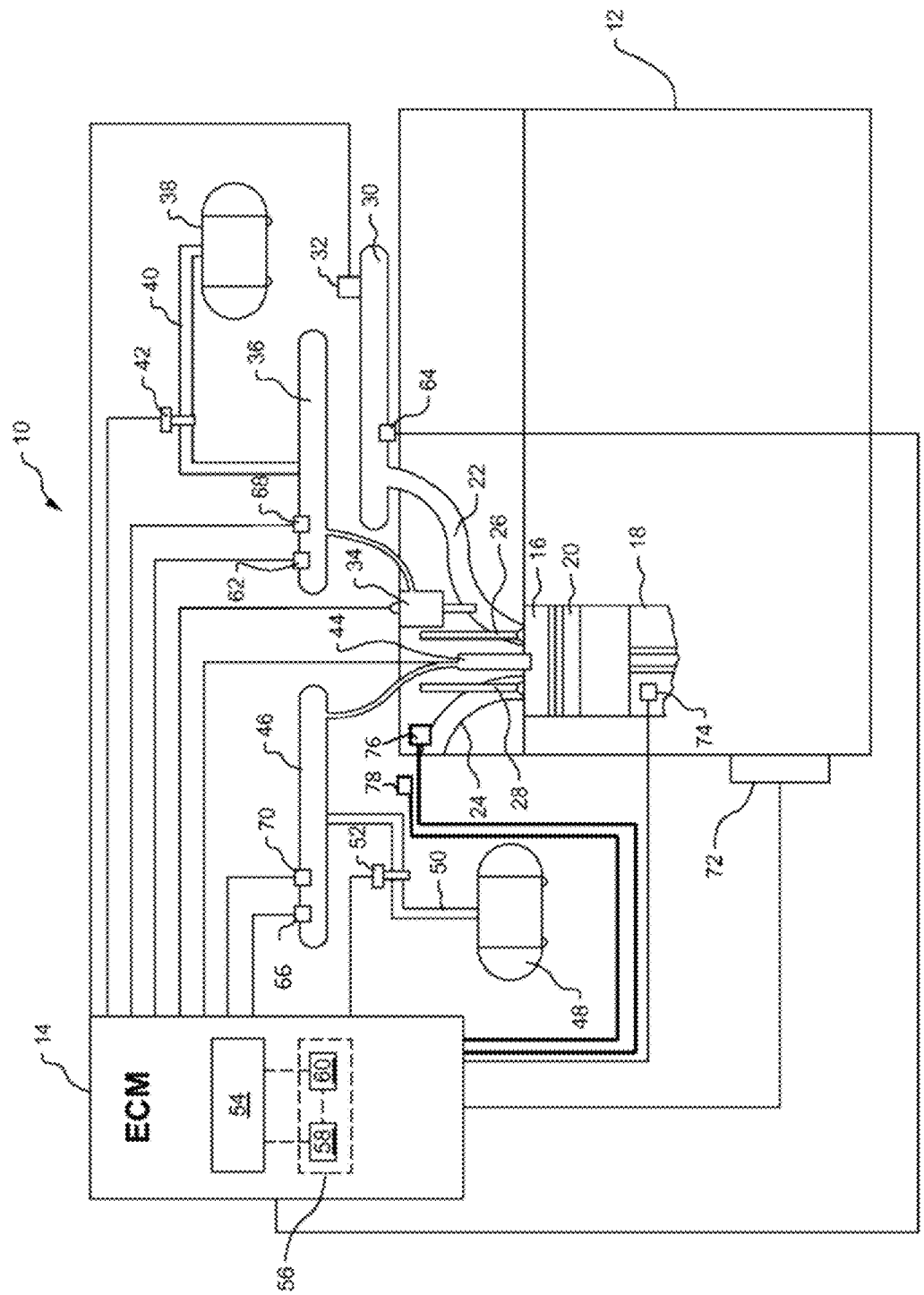
FIG. 1 is a block diagram of an engine system according to one or more embodiments of the disclosed subject matter.

Referring now to the drawings, FIG. 1 shows a diagram of an exemplary engine system 10 in accordance with one or more embodiments of the disclosed subject matter. The engine system 10 may include an engine 12 and an electronic control unit (ECU) or electronic control module (ECM) 14. The engine system 10 may be part of machine, such as a marine vessel (e.g., a ship), though embodiments of the disclosed subject matter are not limited to the context of engine systems in marine vessels.

Engine 12 can be a dual fuel internal combustion engine configured to run on either or both of liquid (e.g., diesel) fuel and gaseous fuel (e.g., natural gas) at a range of relative ratios depending on performance requirements and availability of the fuel sources. In some instances, the gaseous fuel may be considered a primary fuel and the liquid fuel may be considered a secondary fuel. In such a case, the engine 12 may be configured to run in a dual fuel mode in which the gaseous fuel provides most of the power to the engine 12 and the liquid fuel may be used as an ignition source to initiate combustion of a mixture of the gaseous fuel and air. The engine 12, however, may also be configured to run on all liquid fuel when the gaseous fuel supply is low, or on various relative fractions of liquid and gaseous fuels.

The engine 12 may include a combustion chamber 16 disposed in a cylinder 18, a piston 20 positioned for displacement within the cylinder 18, an intake port 22 configured to supply the combustion chamber 16 with a mixture of air and gaseous fuel (e.g., natural gas), an exhaust port 24, and an intake valve 26 and an exhaust valve 28 for regulating fluid communication between the cylinder 18 and the intake port 22 and the exhaust port 24, respectively. An exhaust port 24 may be provided in respective association with each combustion chamber 16 and may lead to an exhaust manifold of the engine 12 or the engine system 10, which itself can lead to an exhaust system of the engine system 10. Thus, though the engine 12 is shown with only one cylinder 18, it will be understood that the actual number of the cylinders 18 (and related components such as combustion chamber 16, piston 20, etc.) can be more than one (e.g., eight, twelve, etc.), and that the engine 12 can be of an in-line type, a V-type, or a rotary type, non-limiting examples.

The intake port 22 may receive air from an air intake manifold 30, which may include an airflow controller 32 configured to regulate air characteristics (e.g., pressure and/or airflow) within the intake manifold 30 and the intake port 22. Air provided to the air intake manifold 30 may first pass through a turbocharger and/or an air filter.

A flow regulating device 34, such as a gaseous fuel admission valve, may be positioned between a gaseous fuel manifold 36 at an upstream side and the intake port 22 at a downstream side. A nozzle portion of the flow regulating device 34 may extend into the intake port 22 and deliver gaseous fluid thereto for mixing with air from the air intake manifold 30 prior to the delivery of the air/gaseous fuel mixture to the cylinder(s) 18. The gaseous fuel manifold 36 may be connected to a gaseous fuel source 38 by a fuel path 40, and a gaseous fuel control valve 42, such as a solenoid-operated gaseous fuel shut-off valve, may be positioned along the fuel path 40 to control (including shut off) the flow of gaseous fuel to the gaseous fuel manifold 36. The gaseous fuel source 38 may provide a natural gas fuel that may contain various combustible constituents such as, but not limited to, methane, ethane, propane, butane, nitrogen, and/or carbon dioxide in various relative percentages, although other types of gaseous fuel may be provided.

The engine system 10 may further include a flow regulating device (or devices) 44 to supply liquid fuel (e.g., diesel fuel) into the combustion chamber(s) 16. According to one or more embodiments, the flow regulating device 44 can be a fuel injector configured to inject the liquid fuel into the combustion chamber 16. The liquid fuel may be provided to the flow regulating device 44 from a common rail 46 that is supplied with fuel from a fuel source 48 via a fuel path 50. A liquid fuel control valve 52, such as a solenoid-operated shut off valve, may be positioned along the fuel path 50 to control (including shut off) the flow of liquid fuel to the common rail 46.

As alluded to above, the engine 12 may operate in a dual fuel mode. In the dual fuel mode, the gaseous fuel from the gaseous fuel source 38 may be discharged into the intake port 22 by the flow regulating device 34 and may be mixed with air from the air intake manifold 30, while a relatively small or pilot amount of the liquid fuel may be provided (e.g., injected) into the cylinder 18 by the flow regulating device 44 in order to ignite the mixture of air and gaseous fuel in the combustion chamber 16.

Generally, the electronic control module (ECM) 14 can control operation of the engine 12 and various supporting components of the engine system 10. The ECM 14 of the engine system 10 can be in electronic or electrical communication with the various supporting components for the engine 12. The ECM 14, via such configuration, can control the apportionment and quantity of the liquid fuel, as well as the apportionment and quantity of the gaseous fuel to the engine 12 along with air from the air intake manifold 30 according to a suitable air-fuel ratio (AFR), for combustion in the combustion chamber 16.

The ECM 14 may include a microprocessor 54 for executing specified programs that control and monitor various functions associated with the engine system 10. The microprocessor 54 may include a memory 56, such as a read only memory (ROM) 58 that may store a program or several programs, as well as a random access memory (RAM) 60 that may serve as a working memory area for use in executing the program(s) stored in the memory 56. The ECM 14 may also have or otherwise be operatively connected to input/output interfaces (e.g., software-implemented logic or input/output circuitry, such as an output driver) to receive signals from and/or send signals to various components of the engine system 10. Though the microprocessor 54 is shown, it is also possible to use other electronic components such as a microcontroller, an ASIC (application specific integrated circuit) chip, or any other integrated circuit device.

The engine system 10 can include an engine speed sensor 72 and one or more exhaust temperature sensors 76. Notably, the engine system 10 can also have a nitrous oxide (NOx) sensor 78. Outputs from the foregoing sensors can be provided to the ECM 14 via corresponding electrical communication paths (e.g., wiring). Engine load data can be provided to the ECM 14 or otherwise determined by the ECM 14 based on signals from one or more sensors of the engine system 10. According to one or more embodiments, engine load data may include or be an engine load factor value.

Optionally, the engine system 10 can have an intake air pressure sensor 64, a gaseous fuel pressure sensor 62, a liquid fuel pressure sensor 66, temperature sensors 68 and 70 provided in the gaseous fuel manifold 36 and the common rail 46, respectively, and/or an indicated mean effective pressure (IMEP) sensor 74. IMEP can be determined from the in-cylinder pressure over the combustion cycle of the engine 12 and may provide a measure of energy released or work performed in the cylinder 18 over the combustion cycle of the engine 12. Outputs from the foregoing sensors can be provided to the ECM 14 via corresponding electrical communication paths (e.g., wiring).

The nitrous oxide (NOx) sensor 78 can be provided downstream of the exhaust port(s) 24, for instance, in an exhaust system of or associated with the engine system 10. The NOx sensor 78 can sense or detect an amount or amounts of nitrous oxide(s) in exhaust gases output by the engine 12. As shown in FIG. 1, the output from the NOx sensor 78 can be provided as feedback to the ECM 14. Discussed in more detail below, such feedback may be characterized as closed-loop feedback and may be associated with a desired NOx value and a NOx error value.

The intake air pressure sensor 64 can be in or at the air intake manifold 30 and may be used to identify inlet or intake manifold air pressure (IMAP). Hence, the intake air pressure sensor 64 may be referred to as an IMAP sensor. The output signal from the intake air pressure sensor 64, which may be referred to as an actual IMAP signal, may be fed back to the ECM 14. The ECM 14 may use the actual IMAP signal to generate an IMAP error signal by subtracting the actual IMAP signal and a desired IMAP signal. The desired IMAP signal, or a control signal based thereon or derived therefrom, such as an air-fuel ratio (AFR) control signal, can be output from the ECM 14 to the airflow controller 32 to control air characteristics (e.g., air flow and/or air pressure) within the air intake manifold 30. Such control signaling can control the AFR and/or the IMAP for the engine 12.

The engine speed sensor 72, which may be associated with a camshaft or other component of the engine 12, can output signals corresponding to operating speed of the engine 12 or otherwise used by the ECM 14 to determine the speed of the engine 12. Thus, the output of the engine speed sensor 72 can be provided to the ECM 14 as an input. Such input may also be referred to as an engine speed signal.

The one or more exhaust temperature sensors 76 can be provided on a per-exhaust port 24 basis and can be configured to sense exhaust temperature at each of the exhaust ports 24. In such a case, the outputs from the exhaust temperature sensors 76 can be provided to the ECM 14, which can calculate an overall exhaust port temperature. The overall exhaust port temperature, according to one or more embodiments, may be an average exhaust port temperature. Additionally or alternatively, one or more exhaust temperature sensors 76 may be provided downstream of the exhaust port(s) 24, for instance, in an exhaust system of the engine system 10. According to one or more embodiments, the exhaust temperature sensor 76 can be provided to sense temperature at an inlet of a turbine of the machine. Hence, output from the exhaust temperature sensor 76 may be characterized as (actual) turbine inlet temperature. In any case, the output of the exhaust temperature sensor(s) 76 or an overall exhaust temperature determination based thereon can be characterized or referred to as actual exhaust temperature of exhaust gases outputted based on operation of the engine 12. Discussed in more detail below, such feedback may be characterized as closed-loop feedback and may be associated with a desired exhaust temperature value and an exhaust temperature error value.

The ECM 14 may be electrically connected to and may control various control devices (e.g., actuators, valves, etc.) of corresponding fluid flow regulating devices of the engine system 10, such as the flow regulating device 34, the gaseous fuel control valve 42, the flow regulating device 44, the liquid fuel control valve 52, and the airflow controller 32 via respective conductive pathways. Such control can be to control flow rate, pressure, timing, etc. of the corresponding fluid (i.e., gaseous fuel, liquid fuel, or air).

The ECM 14 can include or implement one or more engine control systems or engine controllers each adapted to provide pilot fuel quantity control, particularly by generating a pilot fuel offset value and outputting a corresponding pilot fuel offset signal. The pilot fuel offset value can be additively applied as an addend to generate a pilot fuel quantity value and output a corresponding pilot fuel quantity control or command signal. The pilot fuel quantity control signal can be sent to a power fuel apportionment system of or external to the ECM 14 to control at least the amount of pilot fuel provided to the engine 12. The associated portion of the power fuel apportionment system may include or control at least the flow regulating device 44 to control the quantity or amount of pilot fuel provided to the engine 12.

Each engine control system/engine controller of the ECM 14 can also be adapted to provide air-to-fuel ratio (AFR) control, particularly by determining an AFR command trim value and outputting a corresponding AFR command trim signal. The AFR command trim value can be multiplicatively applied as a multiplicand to generate an AFR command or control signal. The AFR control signal can be sent to a power fuel apportionment system of or external to the ECM 14 to control at least the AFR for the engine 12. The associated portion of the power fuel apportionment system may include or control at least the airflow controller 32, the flow regulating device 34, and/or the intake valve 26. Incidentally, trim, as used herein, can mean an adjustment value. Hence, trimming can mean applying an adjustment value to another value to adjust the value.

Discussed in more detail below, according to some embodiments, only the pilot fuel quantity control can be based on NOx error determined from a comparison of desired NOx and actual NOx from the NOx sensor 78, whereas in other embodiments only the AFR control can be based on the NOx error. Requirements for acceptable NOx may be according to IMO III. As an example, the NOx requirement for at least some engines 12 according to embodiments of the disclosed subject matter can be 2.6 g/kW/hr, which corresponds to approximately 240 ppm NOx at full load. In this regard, engines according to embodiments of the disclosed subject matter may initially be calibrated (e.g., factory calibration) to approximately 200 ppm NOx. Also discussed in more detail below, according to some embodiments, only the AFR control can be based on exhaust temperature error determined from a comparison of desired exhaust temperature and actual exhaust temperature from the exhaust temperature sensor(s) 76, whereas in other embodiments only the pilot fuel quantity control can be based on the exhaust temperature error.

The output of the portion of the engine control system/engine controller that controls pilot fuel quantity can be outputted directly from that portion of the engine control system/controller to a component or components of the engine system 10 that control the amount of pilot fuel provided to the engine 12, such as the liquid fuel control valve 52 and/or the flow regulating device 44. Alternatively, the output of the portion of the engine control system/engine controller that controls pilot fuel quantity can be further processed by the ECM 14 prior to being output as a pilot fuel quantity control signal or pilot fuel quantity control signals.

Similarly, the output of the portion of the engine control system/engine controller that controls AFR can be outputted directly from that portion of the engine control system/engine controller to a component or components of the engine system 10 that control the AFR for the engine 12, such as the airflow controller 32, the intake valve 26, the flow regulating device 34, and/or the gaseous fuel control valve 42. Alternatively, the output of the portion of the engine control system/engine controller that controls the AFR for the engine 12 can be further processed by the ECM 14 prior to being output as an AFR control signal or AFR control signals.

Figure 2:
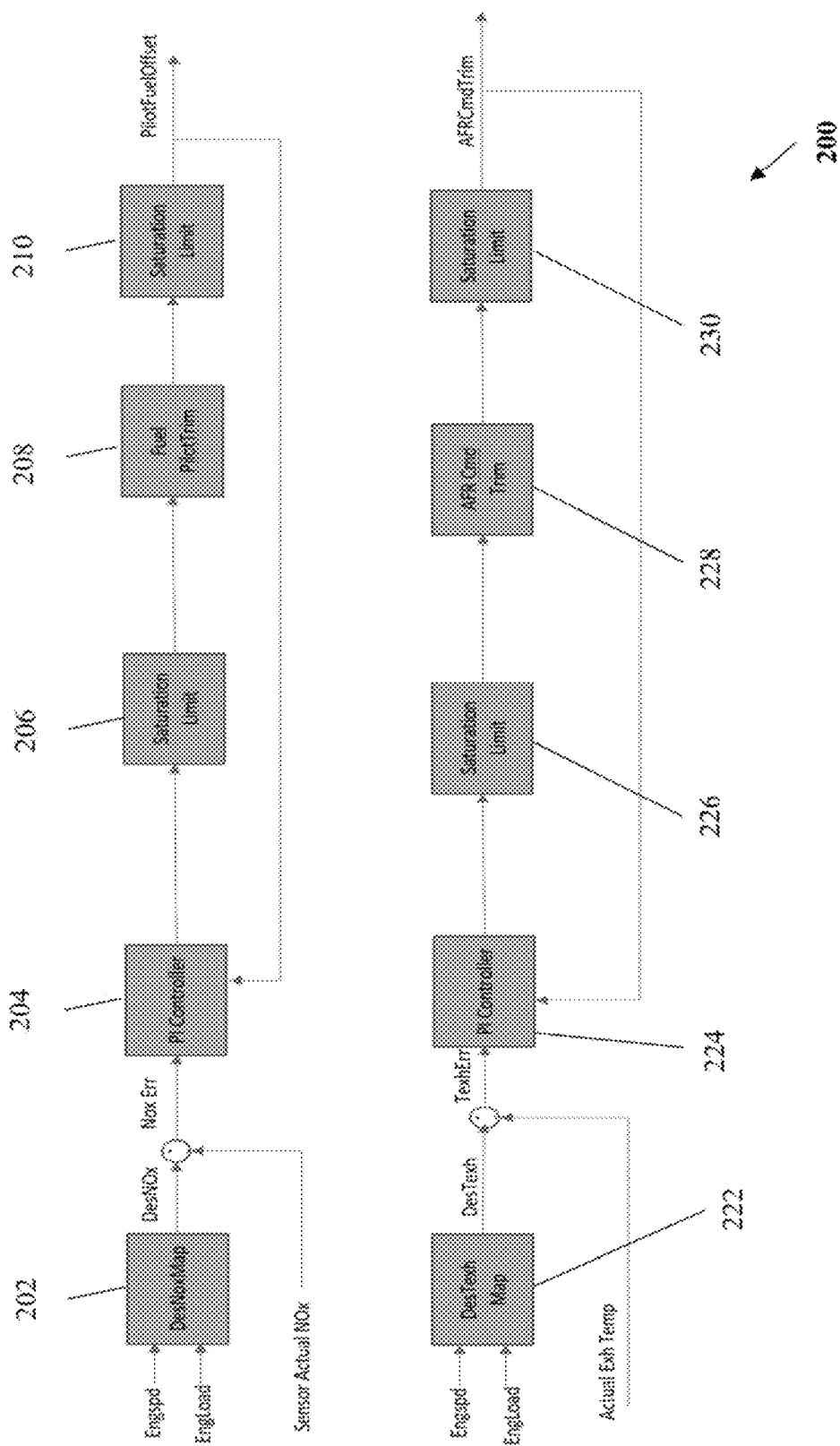
FIG. 2 is a block diagram of an engine control system or engine controller according to one or more embodiments of the disclosed subject matter.

Turning to FIG. 2, FIG. 2 shows an exemplary engine control system or engine controller 200, which may be implemented in or using a controller or control circuitry, according to one or more embodiments of the disclosed subject matter. Some or all of the engine controller 200 can be implemented in the ECM 14. Thus, in some respects the engine controller 200 can be considered or characterized as an engine control subsystem (of the ECM 14). Generally, engine controller 200 can determine and output NOx error-based control signaling and determine and output exhaust temperature error-based control signaling. Discussed in more detail below, such signaling can be individually and exclusively applied to generate pilot fuel quantity signals and AFR control signals.

Engine controller 200 can include a plurality of control subsystems or control modules, such as shown in FIG. 2. Each control subsystem or control module may be encoded in the ECM 14 or otherwise implemented by or using circuitry of the ECM 14. Inputs to the engine controller 200 can include engine speed (Engspd), engine load (EngLoad), actual NOx (Sensor Actual NOx), and actual exhaust temperature (Actual Exh Temp). The engine speed signal can be provided by the engine speed sensor 72; the engine load signal can be determined, for instance, by the ECM 14, based on outputs from one or more sensors of the engine system 10, such as the intake air pressure sensor 64, the engine speed sensor 72, the one or more exhaust temperature sensors 76, the gaseous fuel pressure sensor 62, the liquid fuel pressure sensor 66, the temperature sensors 68 and/or 70, and/or the indicated mean effective pressure (IMEP) sensor 74; the actual NOx signal can be from the NOx sensor 78; and the actual exhaust temperature can be provided by the one or more exhaust temperature sensors 76. According to one or more embodiments, the engine load signal can be an engine load factor signal.

Control module 202, which may be referred to as DesNoxMap module 202, can output a desired NOx signal DesNOx. Such desired NOx signal can be determined by the control module 202 based on the engine speed signal Engspd and the engine load signal EngLoad as inputs. The control module 202 can apply or otherwise implement a mapping to generate the desired NOx signal as a function of the engine speed signal Engspd and the engine load signal EngLoad. The map of the control module 202 can be previously calibrated based on the engine 12 and hence include or operate based on engine-calibrated data. Incidentally, a default value for the desired NOx signal can be 200 ppm.

The desired NOx signal DesNOx from the control module 202 can be compared to the actual NOx signal Sensor Actual NOx from the NOx sensor 78 to obtain a NOx error signal Nox Err. More specifically, the actual NOx signal can be subtracted from the desired NOx signal to obtain the NOx error signal. The NOx error signal can be provided to a control module 204.

Control module 204 can be a proportional-integral (PI) controller, which may be configurable for proportional and integral gains, for instance, scheduled as a function of engine speed and engine load. Thus, in addition to the NOx error signal the control module 204 can also receive as inputs the engine speed signal Engspd and the engine load sign EngLoad. According to one or more embodiments, the output of the control module 204 can be characterized as a NOx-based fuel reactivity compensation output signal. According to one or more embodiments, the operation of the control module 204 can include calculation(s) for additive trim pilot fuel power from a nominal mapped value as a function of the NOx error signal provided as an input. The output of the control module 204 can be provided to a control module 206.

Control module 206, which may be or configured as a saturation limit module (e.g., a dynamic instrumented limit module), can receive the output of the control module 204 and normalize the NOx error signal. Optionally, control module 206 can be considered part of the control module 204 in the form of the PI controller. The output of control module 206 ultimately can be additively applied to a power cycle pilot output of a desired ignition power module or system to obtain a trimmed or offset pilot power command to be sent to a power fuel apportionment module or system. Such trimmed or offset pilot power command may also be referred to herein as a pilot fuel quantity control or command signal.

Regarding additively trimming pilot fuel power, the output of the control module 206 can be provided to a control module 208. The control module 208 can process the input from control module 206 and determine a pilot fuel trim or offset amount and output a pilot fuel trim or offset signal corresponding to the determined pilot fuel trim amount. Such pilot fuel trim signal can be output to a control module 210 that processes the signal according to saturation limit processing (e.g., dynamic saturation processing), ultimately to output a pilot fuel offset signal PilotFuelOffset. The saturation limit processing at control module 210 can compare the value of the pilot fuel offset signal to a maximum allowable trim change amount (e.g., a maximum allowable trim change percentage) in order to limit the amount of change per loop to no more than a specified incremental change.

The pilot fuel offset signal outputted from the control module 210 can be added to a pilot fuel power signal to form a pilot fuel quantity control signal that can sent to a power fuel apportionment system of the ECM 14 or otherwise of the engine system 10 to control the amount of pilot fuel provided to the engine 12. The pilot fuel quantity control signal may be referred to or characterized as a trimmed or offset (additively) pilot fuel quantity control signal. Therefore, for the additively trimming pilot fuel power of the engine controller 200, the engine controller 200 can additively trim pilot fuel power from a nominal mapped value as a function of NOx error. Control module 210 can also provide feedback signaling as additional inputs to the control module 204. The feedback signaling from the control module 210 may be based on NOx limit Hi and NOx limit Low signals. As noted above, the output from control module 210 can also be applied to create a pilot fuel quantity control signal, for instance, by the ECM 14, to control pilot fuel quantity for the engine 12. The pilot fuel quantity control signal may be characterized as a trimmed or offset pilot fuel control signal.

Integral management (including integral mode management) can include initiate, reset, and freeze functionality. Instrumented saturation limits can be provided on the output, such as discussed above regarding control module 206 and control module 210, and an integrator associated with the control module 204 can freeze when the output is saturated high or low. According to one or more embodiments, the integrator can be frozen based on when hitting the saturation limits on field-oriented control (FCF) and/or when in transient condition(s) based on the engine speed error. The integrator can stay in initialize mode with an output value of zero below an engine speed and/or engine load threshold(s). Put another way, associated integral management regarding control modules 204-210 can saturate pilot quantity trim, freeze the compensation during transient events, and prevent integral windup. Thus, based on the determined trim pilot fuel trim value a pilot fuel quantity value can be saturated based on the integral management operations associated with control modules 204-210. This may involve processing including checking of, if pilot fuel offset is at a maximum limit and the error is positive or if the pilot fuel offset is at a minimum limit and the error is negative, then the control can freeze the integrator, across the board.

Control module 222, which may be referred to as DesTexh Map module 222, can output a desired exhaust temperature signal DesTexh. Such desired exhaust temperature signal can be determined by the control module 222 based on the engine speed signal Engspd and the engine load signal EngLoad as inputs. The control module 222 can apply or otherwise implement a mapping to generate the desired exhaust temperature signal DesTexh as a function of the engine speed signal Engspd and the engine load signal EngLoad. The map of the control module 222 can be previously calibrated based on the engine 12 and hence include or operate based on engine-calibrated data. The desired exhaust temperature signal can be an average temperature for all of the cylinders as calculated by the ECM 14, or, alternatively, a desired temperature at the inlet of a turbine of the engine system 10.

The desired exhaust temperature signal DesTexh from the control module 222 can be compared to the actual exhaust temperature signal Actual Exh Temp signal from the one or more exhaust temperature sensors 76 to obtain an exhaust temperature error signal TexhErr. More specifically, the actual exhaust temperature signal can be subtracted from the desired exhaust temperature signal to obtain the exhaust temperature error signal. Optionally, the exhaust temperature, whether actual and/or desired, can correspond to turbine inlet temperature. The exhaust temperature error signal can be provided to a control module 224.

Control module 224 can be a proportional-integral (PI) controller, which may be configurable for proportional and integral gains, for instance, scheduled as a function of engine speed and engine load. Thus, in addition to the exhaust temperature error signal, the control module 244 can also receive as inputs the engine speed signal Engspd and the engine load sign EngLoad. According to one or more embodiments, the output of the control module 224 can be characterized as an exhaust temperature-based fuel reactivity compensation output signal. According to one or more embodiments, the operation of the control module 224 can include calculation of an AFR control or command trim value as a function of the exhaust temperature error signal provided as an input. The output of the control module 224 can be provided to a control module 226.

Control module 226, which may be or configured as a saturation limit module (e.g., a dynamic instrumented limit module), can receive the output of the control module 224 and normalize the exhaust temperature error signal. Optionally, control module 226 can be considered part of the control module 224 in the form of the PI controller. The output of control module 226 ultimately can be processes to generate a multiplicative AFR control trim value as a function of exhaust temperature error.

Regarding multiplicatively trimming the AFR control trim value, the output of the control module 226 can be provided to a control module 228. The control module 228 can process the input from control module 226 and determine an AFR control or command trim amount and output an AFR command trim signal corresponding to the determined AFR command trim amount. Such AFR command trim signal can be output to a control module 230 that processes the signal according to saturation limit processing (e.g., dynamic saturation processing), ultimately to output an AFR control or command trim signal AFRCmdTrim. The saturation limit processing at control module 230 can compare the value of the input AFR command trim signal to a maximum allowable trim change amount (e.g., a maximum allowable trim change percentage) in order to limit the amount of change per loop to no more than a specified incremental change. Such AFR command trim signal may also be referred to herein as an AFR control trim signal and may be multiplicatively applied to an AFR command or control signal, for instance, by the ECM 14, to control AFR for the engine 12. The AFR control signal may be characterized as a trimmed AFR control signal.

Integral management (including integral mode management) can include initiate, reset, and freeze functionality. Instrumented saturation limits can be provided on the output, such as discussed above regarding control module 226 and control module 230, and an integrator associated with the control module 224 can freeze when the output is saturated high or low. According to one or more embodiments, the integrator can be frozen based on when hitting the saturation limits on field-oriented control (FCF) and/or when in transient condition(s) based on the engine speed error. The integrator can stay in initialize mode with an output value of zero below an engine speed and/or engine load threshold(s).

Put another way, associated integral management regarding control modules 224-230 can saturate AFR trim, freeze the compensation during transient events, and prevent integral windup. Thus, based on the determined multiplicative trim AFR value an AFR command value can be saturated based on the integral management operations associated with control modules 224-230.

Figure 3:
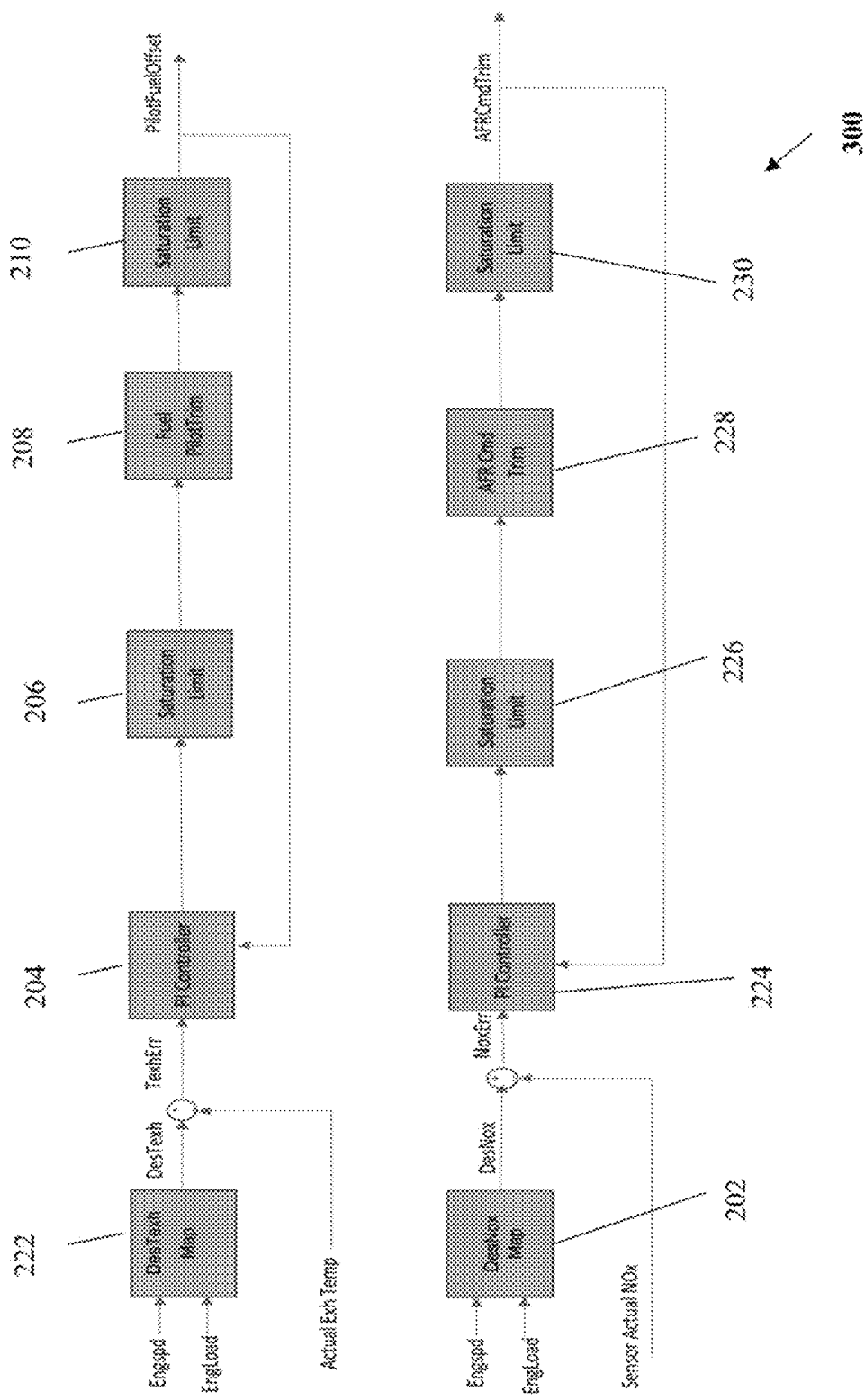
FIG. 3 is a block diagram of an engine control system or engine controller according to one or more embodiments of the disclosed subject matter.

Turning to FIG. 3, FIG. 3 shows an exemplary engine control system or engine controller 300, which may be implemented in or using a controller or control circuitry, according to one or more embodiments of the disclosed subject matter. Some or all of the engine controller 300 can be implemented in the ECM 14. Thus, in some respects the engine controller 300 can be considered or characterized as an engine control subsystem (of the ECM 14).

Generally, engine controller 300 can determine and output NOx error-based PI control signaling to additively trim pilot fuel power and can determine and output exhaust temperature error-based PI control signaling to multiplicatively trim AFR. Thus, engine controller 300 is similar to engine control 200 of FIG. 2, but notably reverses the inputs for determining the additive trim pilot fuel power and multiplicative trim AFR. That is, as shown in FIG. 3, an input to the control module 204 can be the exhaust temperature error TexhErr determined from a comparison of the actual exhaust temperature Actual Exh Temp and the desired exhaust temperature DesTexh from the control module 222 as a function of engine speed Engspd and engine load EngLoad. Likewise, an input to the control module 224 can be the NOx error NoxErr determined from a comparison of the actual NOx signal Sensor Actual NOx and the desired NOx signal DesNox from the control module 202 as a function of the engine speed Engspd and the engine load EngLoad. Hence, in the engine controller 300 the control module 222 and subsequent control modules 204-210 may be referred to as an exhaust temperature controller and the control module 202 and subsequent control modules 224-230 may be referred to as a NOx controller, whereas in engine controller 200 the control module 202 and subsequent control modules 204-210 may be referred to as a NOx controller and the control module 222 and subsequent control modules 224-230 may be referred to as an exhaust temperature controller.

As noted above, in engine controller 200 and engine controller 300, respective integral management can saturate the pilot quantity trim and AFR trim, freeze compensation during transient events, and prevent integral windup. According to one or more embodiments, the ECM 14 can be provided with both the engine controller 200 and the engine controller 300 and can selectively implement one or the other, for instance, switching from one to the other.

INDUSTRIAL APPLICABILITY

As noted above, embodiments of the disclosed subject matter can relate to systems, apparatuses, and methods to control an engine system to account for varying fuel quality. The control can provide fuel reactivity compensation for differing qualities of fuel(s).

Figure 4:
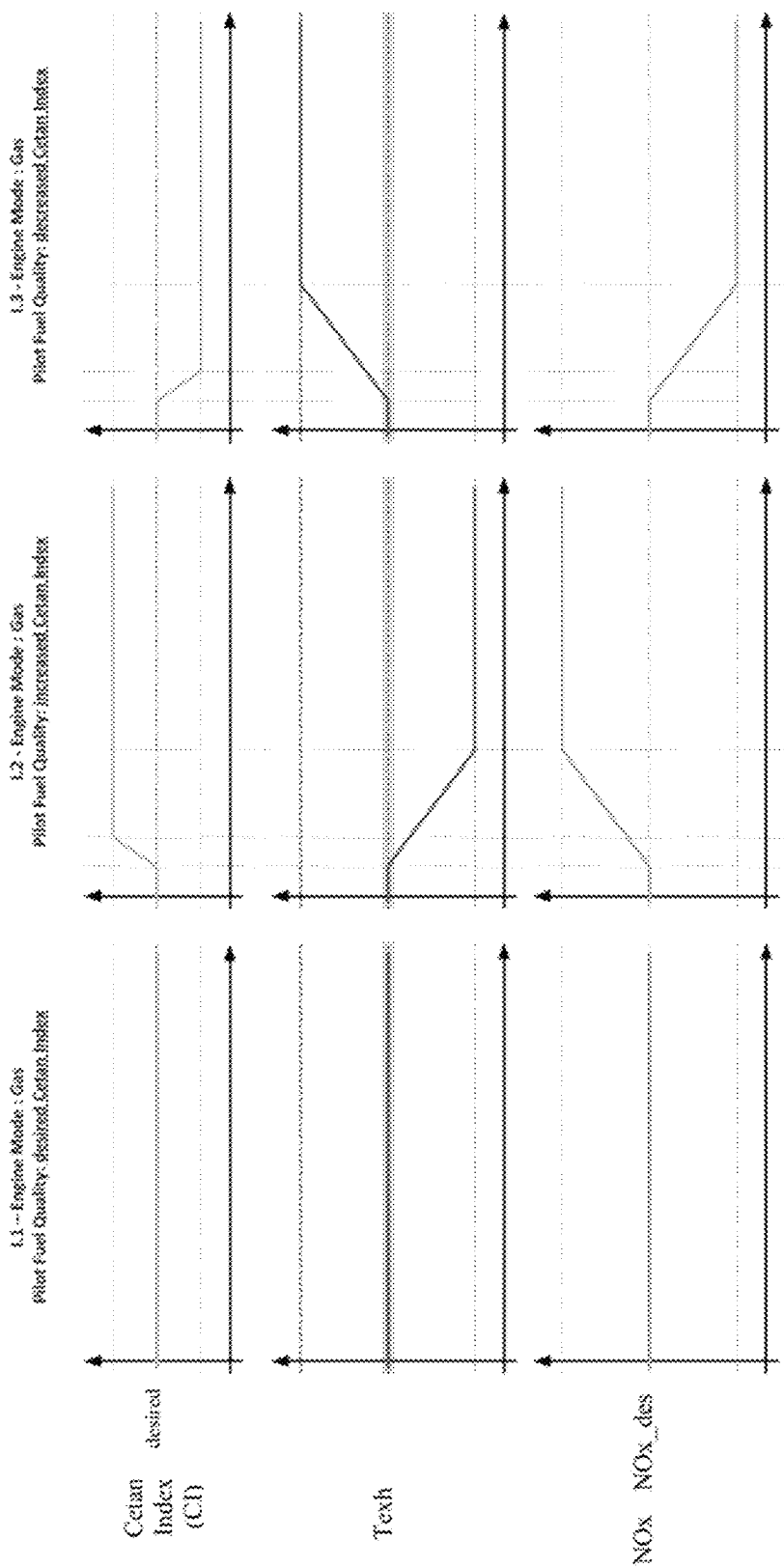
FIG. 4 shows graphs of the influence of the cetane index (CI) with respect to exhaust temperature $T_{Exh}$ and nitrous oxide NOx according to a particular engine mode.

FIG. 4 shows graphs of the influence of the cetane index (CI) with respect to exhaust temperature $T_{Exh}$ and nitrous oxide NOx according to a particular engine mode (in this case a gas mode of a dual fuel engine, such as engine 12).

The cetane index (CI) can denote the quality of a diesel fuel based upon its density and volatility and may be an indicator of the combustion speed of diesel fuel and compression needed for ignition. Put another way, CI can be a measure of chemical reactivity of diesel fuel. Generally, the lower the CI the lower the quality the diesel fuel is considered (e.g., lower CI can mean that the diesel fuel has a slower reaction rate). As shown in FIG. 4, higher CI value can correspond to higher NOx value but lower exhaust temperature, whereas lower CI value can correspond to lower NOx value but higher exhaust temperature.

The methane number, which may be characterized as a measure of the resistance of gaseous fuel (e.g., natural gas) to detonation when burned, can form a similar metric for gaseous fuel. Generally, the lower the methane number the lower the quality the gaseous fuel is considered (e.g., has a higher reactivity rate). Lower methane number value can correspond to higher NOx value but lower exhaust temperature, and higher methane number value can correspond to lower NOx value but higher exhaust temperature.

Individually adjusting each of air-to-fuel ratio (AFR) and pilot fuel quantity can, separately, influence NOx emissions. Likewise, individually adjusting each of air-to-fuel ratio (AFR) and pilot fuel quantity can separately influence exhaust temperature of the engine 12. However, controlling only one of the pilot fuel quantity or the AFR may be ineffective to stay within both NOx emissions limits and exhaust temperature limits, particularly across a range of fuels with differing qualities that the engine 12 is likely to receive and run on. The prospect of differing fuel qualities, often step changes in quality, can be a regular occurrence in the marine environment, where failure to properly calibrate for the specific fuel quality or qualities can cause the following undesirable conditions: high turbine inlet temperatures, detonation (knock), misfire, and/or emissions out of compliance (e.g., nitrous oxide (NOx) out of compliance).

Accordingly, embodiments of the disclosed subject matter can individually control both pilot fuel quantity and AFR to simultaneously control NOx and exhaust temperature of the engine 12. Such control can be to compensate or otherwise account for varying fuel quality for each fuel of the engine 12. More specifically, control for each engine control system/engine controller 200, 300 can automatically calibrate the engine 12 to accommodate for different fuel quality introduced into the engine 12. Thus, in that NOx and exhaust temperature can be sensitive to fuel quality, i.e., fuel reactivity, combined or coordinated pilot fuel quantity control and exhaust temperature control according to embodiments of the disclosed subject matter can be characterized as fuel reactivity control or compensation.

Control methodologies, such as those implemented using engine controller 200 and engine controller 300, can decrease NOx error or maintain NOx error within a specified limit. The control can also maintain exhaust temperature within a specified temperature range. Each of such controls can be specific to particular load conditions of the engine 12 and can meet operating requirements according to the specified limits across a range of fuels with different qualities. Control methodologies according to embodiments of the disclosed subject matter can thus optimize combustion via a closed loop control system without requiring multiple flash files.

Embodiments of the disclosed subject matter can implement a NOx controller or control system and an exhaust temperature controller or control system in engine controller 200 and engine controller 300 to perform fuel reactivity compensation in an internal combustion engine, such as engine 12. Each of the NOx control and the exhaust temperature controller can be operative or otherwise include a proportional-integral (PI) controller. According to one or more embodiments, the NOx PI controller and the exhaust temperature PI controller may be the only PI controllers of each of the engine controller 200 and the engine controller 300.

Depending upon whether the engine controller 200 or the engine controller 300, a NOx error value can be calculated and used to calculate additive fuel quantity trim and an exhaust temperature error value can be calculated and used to multiplicative AFR trim or vice versa.

Figure 5:
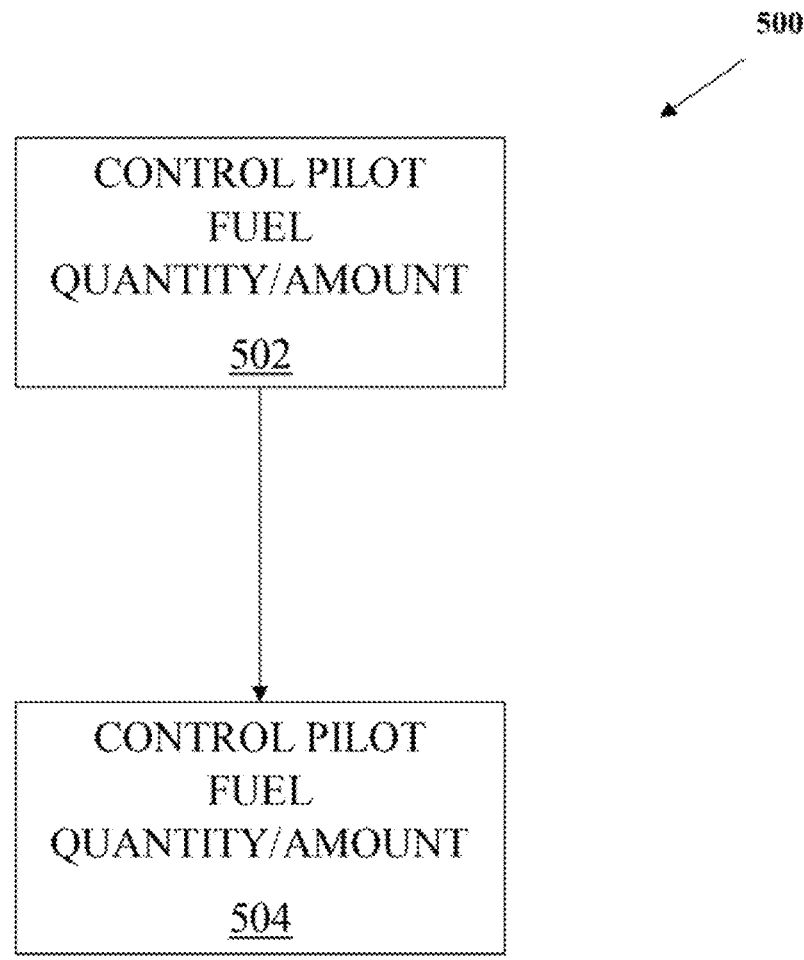
FIG. 5 is a basic flow chart of a control method according to one or more embodiments of the disclosed subject matter.

FIG. 5 is a basic flow chart of a control method 500 according to one or more embodiments of the disclosed subject matter. The control method 500 may be implemented via a non-transitory computer-readable storage medium having stored thereon instructions that, when executed by one or more processors or controllers, cause the one or more processors or controllers to perform the control method 500. Moreover, control method 500 may be implemented using the ECM 14, including the engine control system/engine controller 200 and/or the engine control system/engine controller 300 discussed above. In the case of implementation of both the engine controller 200 and the engine controller 300, the control method 500 transition from control via the engine controller 200 to control via the engine controller 300 and vice versa can be responsive to one or more operating conditions of the engine 2, such as one or more temperatures associated with operation of the engine 12 (e.g., coolant and/or oil) reaching respective predetermined thresholds.

At 502 the control method 500 can include controlling pilot fuel quantity supplied to an engine, such as engine 12. And at 504 the control method 500 can include controlling air-to-fuel ratio (AFR) for the engine 12.

According to one or more embodiments, the pilot fuel quantity at 502 can be controlled based on a nitrous oxide (NOx) error, whereas the AFR control at 504 can be controlled based on an exhaust temperature error. Such control may be performed by the engine controller 200, for instance.

Alternatively, according to one or more embodiments, the pilot fuel quantity at 502 can be controlled based on the exhaust temperature error, whereas the AFR control at 504 can be controlled based on the NOx error. Such control may be performed by the engine controller 300, for instance.

For the controlling of the pilot fuel quantity, a pilot fuel quantity control signal can be generated, for instance, by the ECM 14, from a pilot fuel quantity offset value itself generated using either the NOx error or the exhaust temperature error. The pilot fuel quantity offset value may be an addend of the pilot fuel quantity control value corresponding to the pilot fuel quantity control signal.

For the controlling of the AFR, an AFR control signal can be generated, for instance, by the ECM 14, from an AFR control trim value itself generated using either the exhaust temperature error or the NOx error. The AFR control trim value may be a multiplicand of the AFR control signal value corresponding to the AFR control signal.

Operation 502 and operation 504 of the control method 500 can be performed at the same time. As noted above, coordinated control of both pilot fuel quantity and AFR for the engine 12 can simultaneously control NOx and exhaust temperature of the engine 12.

As noted above, in the case of the engine controller 300 the control module 222 and subsequent control modules 204-210 may be referred to as an exhaust temperature controller and the control module 202 and subsequent control modules 224-230 may be referred to as a NOx controller, whereas in the case of engine controller 200 the control module 202 and subsequent control modules 204-210 may be referred to as a NOx controller and the control module 222 and subsequent control modules 224-230 may be referred to as an exhaust temperature controller.

As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus to perform various functions); and (c) to circuits, such as a microprocessor(s) or a portion of a microprocessor(s), that require software or firmware for operation, even if the software or firmware is not physically present.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An engine control system for a dual fuel engine comprising:
    a nitrous oxide (NOx) sensor configured to sense NOx generated from operation of the dual fuel engine; and
    an engine control module (ECM) configured to control, in real time, pilot fuel quantity and air-to-fuel ratio (AFR) for the operation of the dual fuel engine,
    wherein the ECM includes a NOx controller and an exhaust temperature controller to perform fuel reactivity compensation,
    wherein the NOx controller is configured to generate, according to closed-loop control, a NOx error signal based on a comparison of an actual NOx signal from the NOx sensor and a desired NOx signal generated from a mapping operation of the NOx controller based on engine speed and engine load as inputs,
    wherein the exhaust temperature controller is configured to generate, according to closed-loop control, an exhaust temperature error signal based on a comparison of an actual exhaust temperature signal and a desired exhaust temperature signal generated from a mapping operation of the exhaust temperature controller based on the engine speed and the engine load as inputs,
    wherein one of the NOx controller and the exhaust temperature controller is configured to generate an additive pilot fuel offset signal and the other of the NOx controller and the exhaust temperature controller is configured to generate a multiplicative AFR control trim signal, and
    wherein the ECM is configured to output, at the same time, a pilot fuel quantity control signal generated from additive trimming according to the generated additive pilot fuel offset signal, and an AFR control signal generated from multiplicative trimming according to the generated multiplicative AFR control trim signal to decrease the NOx error signal and maintain the actual exhaust temperature signal within a predetermined, load-dependent exhaust temperature range.

2. The engine control system according to claim 1, wherein the NOx controller generates the additive pilot fuel offset signal using the NOx error signal, and wherein the exhaust temperature controller generates the multiplicative AFR control trim signal using the exhaust temperature error signal.

3. The engine control system according to claim 2, wherein the desired NOx signal is generated according to a first mapping operation of a first control module having the engine speed and the engine load as inputs, and wherein the desired exhaust temperature signal is generated according to a second mapping operation of a second control having the engine speed and the engine load as inputs.

4. The engine control system according to claim 1, wherein the NOx controller generates the multiplicative AFR control trim signal using the exhaust temperature error signal, and wherein the exhaust temperature controller generates the additive pilot fuel offset signal using the NOx error signal.

5. The engine control system according to claim 4, wherein the desired NOx signal is generated according to a first mapping operation of a first control module having engine speed and engine load as inputs, and wherein the desired exhaust temperature signal is generated according to a second mapping operation of a second control module having the engine speed and the engine load as inputs.

6. The engine control system according to claim 1, wherein the ECM is configured to output the pilot fuel quantity control signal to control an amount of liquid fuel supplied to the dual fuel engine.

7. The engine control system according to claim 1, wherein the ECM is configured to output the AFR control signal to control an AFR of air and gaseous fuel provided to the dual fuel engine.

8. The engine control system according to claim 1, wherein the additive pilot fuel offset signal is provided as feedback in said one of the NOx controller or the exhaust temperature controller.

9. The engine control system according to claim 1, wherein the multiplicative AFR control trim signal is provided as feedback in said other of the NOx controller or the exhaust temperature controller.

10. A method of providing fuel reactivity compensation control for a dual fuel engine comprising:
controlling, using control circuitry, pilot fuel quantity supplied to the dual fuel engine for operation of the dual fuel engine based on a generated pilot fuel offset signal; and
controlling, using the control circuitry, air-to-fuel ratio (AFR) for the operation of the dual fuel engine based on a generated AFR control trim signal,
wherein a NOx error value is used to generate one of the pilot fuel offset signal or the AFR control trim signal, and an exhaust temperature error value is used to generate the other of the pilot fuel offset signal or the AFR control trim signal,
wherein the NOx error value is generated from a comparison of an actual NOx value from a NOx sensor and a desired NOx value produced from a first mapping operation based on engine speed and engine load as inputs, and
wherein the exhaust temperature error value is generated from a comparison of an actual exhaust temperature value and a desired exhaust temperature value produced from a second mapping operation based on the engine speed and the engine load as inputs.

11. The method according to claim 10, further comprising determining an operating condition of the dual fuel engine and switching between which of the NOx error value and the exhaust temperature error value is used to generate the pilot fuel offset signal and the AFR control trim signal, respectively, responsive to the determined operating condition meeting a predetermined parameter.

12. The method according to claim 10,
wherein said controlling the pilot fuel quantity includes generating a pilot fuel quantity control value having a pilot fuel offset value associated with the generated pilot fuel offset signal as an addend, and
wherein said controlling the AFR includes generating an AFR control value having an AFR control trim value associated with the AFR control trim signal as a multiplier.

13. The method according to claim 10, further comprising maintaining each of the NOx error value and the exhaust temperature error value to within respective predetermined ranges by said controlling the pilot fuel quantity and said controlling the AFR at the same time during the operation of the dual fuel engine.

14. The method according to claim 10,
wherein the NOx error value is determined according to a first mapping operation having engine speed and engine load as inputs, and
wherein the exhaust temperature error value is determined according to a second mapping operation having the engine speed and the engine load as inputs.

15. A non-transitory computer-readable storage medium having stored thereon instructions that, when executed by one or more processors, cause the one or more processors to perform an engine control method comprising:
controlling pilot fuel quantity supplied to an engine based on a generated pilot fuel offset value; and
controlling air-to-fuel ratio (AFR) for the engine based on a generated AFR control trim value,
wherein a NOx error value is used to generate one of the pilot fuel offset value or the AFR control trim value, and an exhaust temperature error value is used to generate the other of the pilot fuel offset value or the AFR control trim value,
wherein said controlling the pilot fuel quantity includes generating a pilot fuel quantity control value having the generated pilot fuel offset value as an addend, and
wherein said controlling the AFR includes generating an AFR control value having the generated AFR control trim value as a multiplier.

16. The non-transitory computer-readable storage medium according to claim 15, wherein the NOx error value is generated based on a comparison of actual NOx from a NOx sensor and desired NOx determined from a mapping operation having engine speed and engine load as inputs.

17. The non-transitory computer-readable storage medium according to claim 15, wherein the exhaust temperature error signal is generated based on a comparison of an actual exhaust temperature signal and a desired exhaust temperature signal determined according to a mapping operation having engine speed and engine load as inputs.

18. The non-transitory computer-readable storage medium according to claim 15, wherein the engine control method further comprises maintaining each of the NOx error value and the exhaust temperature error value below respective predetermined thresholds by said controlling the pilot fuel quantity and said controlling the AFR at the same time during the operation of the engine.

19. The non-transitory computer-readable storage medium according to claim 15, wherein the pilot fuel offset signal and the AFR control trim signal are provided separately as feedback for said controlling the pilot fuel quantity and said said controlling the AFR.

* * * * *